United States Patent [19]
Weiss

[11] Patent Number: 5,575,737
[45] Date of Patent: Nov. 19, 1996

[54] UTILITY VEHICLE DRIVELINE CONTROL METHOD

[75] Inventor: Heinz Weiss, Bensheim, Germany

[73] Assignee: Deere & Company, Moline, Ill.

[21] Appl. No.: 517,482

[22] Filed: Aug. 21, 1995

[30] Foreign Application Priority Data

Aug. 27, 1994 [DE] Germany ............... 44 30 447.1

[51] Int. Cl.⁶ ............................................. B60K 41/12
[52] U.S. Cl. ........................ 477/43; 477/44; 477/46
[58] Field of Search ............................ 477/37, 43, 44, 477/46, 107, 108, 110

[56] References Cited

U.S. PATENT DOCUMENTS

| | | | |
|---|---|---|---|
| 4,039,061 | 8/1977 | Pruvot et al. | 477/37 X |
| 4,622,867 | 11/1986 | Nishioka et al. | 477/46 |
| 4,648,040 | 3/1987 | Cornell et al. | |
| 4,653,005 | 3/1987 | Osanai et al. | 477/43 X |
| 4,671,138 | 6/1987 | Nobumoto et al. | 477/46 X |
| 4,735,112 | 4/1988 | Osanai et al. | 477/43 |
| 4,872,115 | 10/1989 | Itoh et al. | 477/43 X |
| 5,009,127 | 4/1991 | Morimoto et al. | 477/46 X |
| 5,009,129 | 4/1991 | Morimoto et al. | 477/46 X |

FOREIGN PATENT DOCUMENTS

| | | |
|---|---|---|
| 0280757 | 9/1988 | European Pat. Off. . |
| 0415048 | 3/1991 | European Pat. Off. . |
| 3508155 | 9/1985 | Germany . |
| 3628490 | 4/1987 | Germany . |
| 3533193 | 5/1987 | Germany . |
| 4115623 | 11/1992 | Germany . |
| 4223967 | 1/1994 | Germany . |

*Primary Examiner*—Charles A. Marmor
*Assistant Examiner*—Peter Kwon

[57] ABSTRACT

A method is described for controlling the power train of a work vehicle. The power train includes an engine with a fuel injection control and an infinitely variable transmission. The method include first determining an initial engine speed, an initial wheel speed, the actual engine speed, and the actual wheel speed. To improve comfort and reduce fuel consumption and emissions two steps are performed. First, the transmission ratio of the infinitely variable transmission will be increased if the actual engine speed is less than the initial engine speed, or decreased if the actual engine speed is greater than the initial engine speed. Second, while the transmission ratio remains constant, the engine speed will be adjusted until the engine speed is the same as the initial engine speed.

9 Claims, 4 Drawing Sheets

UTILITY VEHICLE DRIVELINE CONTROL METHOD

BACKGROUND OF THE INVENTION

The invention concerns a process and a control system for the control of the driveline of a utility vehicle that contains a power plant with fuel injection quantity control and an infinitely variable transmission (IVT), in which an initial engine rotational speed, an initial wheel rotational speed, the actual engine rotational speed and the actual wheel rotational speed are determined and stored in memory.

The driveline of utility vehicles, such as agricultural or commercial vehicles, generally contain an internal combustion engine and a transmission. The engine has the requirement that it supply the needed power with the best possible efficiency, while the transmission operates as torque and rotational speed converter adjusting the performance map of the engine to the demand map of the vehicle. In the further development of the driveline, beyond the aforementioned goals of increased productivity, operator comfort, other aspects come increasingly into the foreground, such as exhaust emissions and fuel consumption.

In order to attain these goals infinitely variable transmissions may be employed to great advantage, such as have been described in DE-A-35 33 193 and DE-A-41 15 623. These are hydrostatic-mechanical torque dividing transmissions with an infinitely variable hydrostatic component, consisting of adjustment pump and hydraulic motor, and a mechanical branch with several drive ratios that can be shifted automatically without interrupting the power flow. The drive ratio of these transmissions is infinitely variable over the entire operating range.

EP-A-0 280 757 describes a control and regulating arrangement for such an infinitely variable transmission. The actual engine rotational speed and the actual transmission output rotational speed are continuously determined and compared to the target signal. By continuously varying the drive ratio of the transmission and the engine rotational speed the control system reacts to changes in the target signals or the operating conditions. With increasing tractive resistance the engine rotational speed is initially reduced which results in an increase in the engine control signal in the drive control, in order to make available an increase in engine power. Furthermore the transmission drive ratio is adjusted in order to maintain or to attain the desired vehicle speed. The control system is to be designed in such a way that the transmission drive ratio as well as the engine rotational speed are continuously adjusted for optimum fuel economy.

Furthermore in a technical meeting in Dresden, Germany, in 1989 F. Jarchow proposed an infinitely variable hydrostatic-mechanical transmission for tractors that can be shifted under load and has a control that permits operation along a curve of minimum fuel consumption. On the basis of an optimum fuel consumption curve a voltage can be determined for each position of the gas pedal, which is compared with a voltage corresponding to the transmission input rotational speed. The voltage difference is used to adjust the transmission drive ratio.

SUMMARY OF THE INVENTION

Accordingly, an object of this invention is to provide an improved control system for the control of the driveline of utility vehicles of the aforementioned type.

A further object of the invention is to provide such a control system through which the engine can be operated with regard to main drives.

Another object of the invention is to provide such a control system through which the engine can be operated with regard to secondary drives for hydrostatic pumps, mechanical power take-off shaft drives and the like in terms of productivity, fuel economy and emission characteristics without additional effort by the operator in a favorable operating regime.

These and other objects are achieved by the present invention, which permits the attainment of the goal of reduced fuel consumption with simultaneously reduced emissions as well as an increase in operator comfort. The suggested strategy of transmission drive ratio adjustment permits operation of the engine in areas of the performance map with favorable efficiency. Beyond that it attains improved productivity combined with higher economic efficiency.

In order to utilize fully the potential of the engine, the engine is operated along the constant output torque hyperbola by increasing (decreasing) the transmission drive ratio with constant vehicle parameters, such as speed and load, where the load increases and the engine rotational speed decreases.

It was recognized in particular that the tractive force hyperbola of the vehicle can be normalized and reproduced by means of the constant axle reduction gear ratio on the hyperbolas of constant power of the driveline, so that the areas and the relations of the rectangles to the points of the hyperbolas can be easily estimated and compared to each other.

For reasons of cost, the initial concept is based on a mechanical fuel injection pump which is controlled primarily by the electronic control of the transmission with respect to the determination of the quantity of fuel injected. The proposed process, however, can be transferred without any problems to electronically controlled fuel injection pumps.

Since the operating range of the engine is described only in terms of parameters specific to the engine, the process for the control of a driveline can be applied to all infinitely variable transmissions with torque division and covers the purely mechanical infinitely variable torque dividing transmission Torotrack of the firm Leyland as well as all purely hydrostatic or hydrostatic-mechanical transmissions with torque division. This permits a simple and flexible control of transmission and engine, without requiring torque sensors.

DETAILED DESCRIPTION

Figure 1:
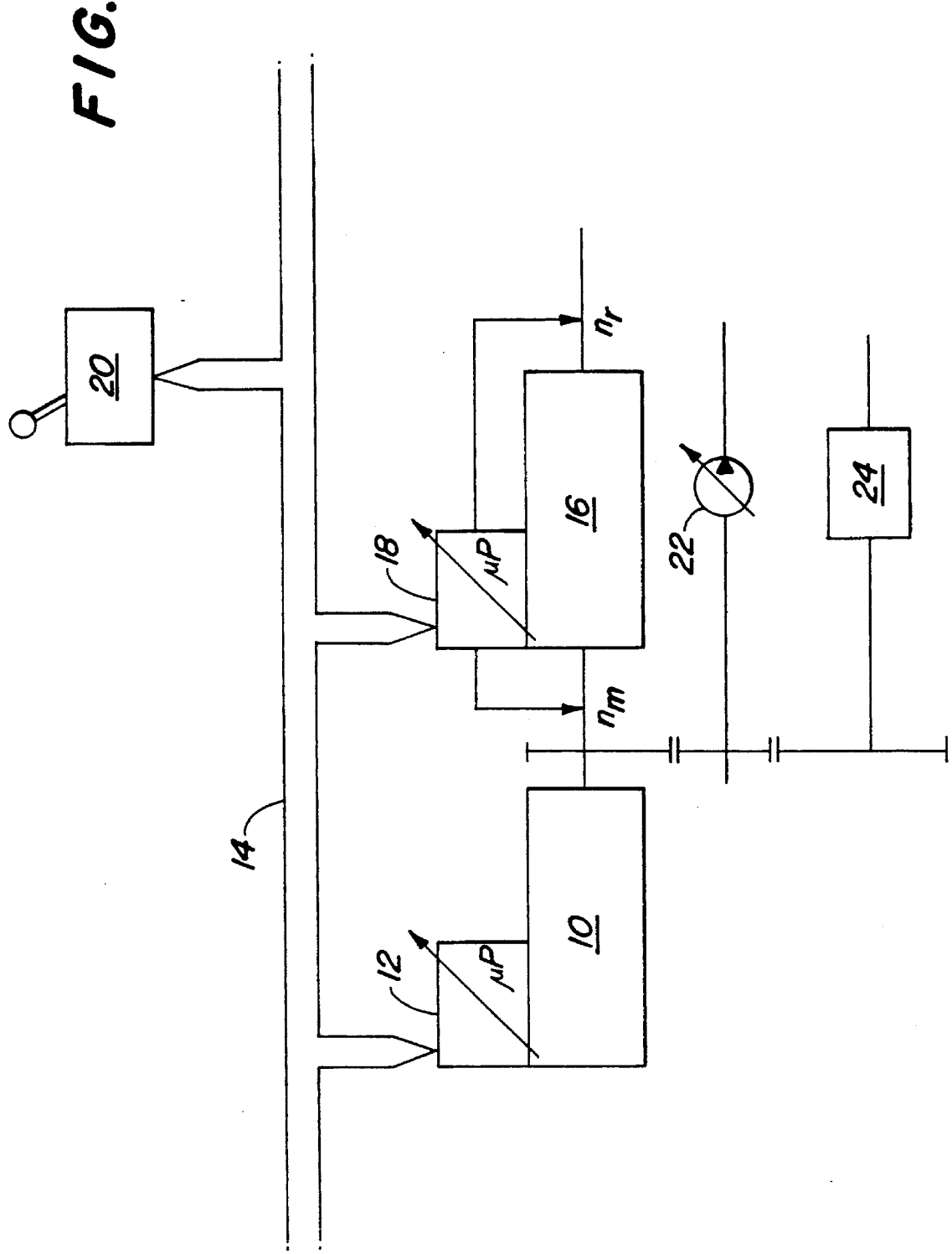
FIG. 1 is a block diagram of a control system according to the invention.

FIG. 1 shows an engine 10 with variable rotational speed that can be controlled by a controller 12 which preferably includes as microprocessor. The controller 12 is preferably connected through a control area network bus 14 or over a direct connection to a transmission controller 18, from which it receives control signals for the fuel injection pump (not shown) of the engine 10 and transmits them to the latter. Thereby the fuel injection pump is not connected directly to the gas pedal or the manually-operated throttle lever 21, as is usual in conventional vehicles, but is controlled by an electronic regulating unit. This regulating unit determines the amount of fuel injected considering the operator's desires (lever and pedal positions), the operating conditions and the performance map of the engine 10.

The engine 10 drives an infinitely variable transmission 16 without an intervening clutch. The drive ratio of the transmission 16 is determined by a drive ratio controller 18, also preferably including a microprocessor and which is also connected to the bus 14. The electronic control of the fuel injection pump 12 and the controller 18 of the transmission 16 interact with each other and may be combined into one component if desired. Furthermore, the bus 14 is connected to an operator's panel 20 through which the operator can provide inputs to influence the control of the driveline.

The infinitely variable part of the transmission 16 preferably consists of an adjusting pump (not shown) with a hydraulic motor (not shown). In the mechanical part several drive ratios are provided which can be shifted automatically without interruption of the power flow. Through the infinitely variable part the transmission permits starting from standstill without the need for a starting clutch. For the standstill condition or the braking of the vehicle, clutches (not shown) separate the driveline from the driving wheels (not shown), in order to avoid stalling the engine or to avoid working of the transmission against the brakes. After the separating process is completed, the separating clutches engage again automatically when synchronization is attained. In place of such a transmission other infinitely variable transmissions may be applied.

Electronic rotational speed measurement transmitters detect the engine output rotational speed N(m) and the transmission output rotational speed, which corresponds to the normalized wheel rotational speed N(r) of the drive wheels. The rotational speeds N(m) and N(r) are continuously measured and stored in memory by the electronic control unit. From these the operating points of the engine and transmission are determined depending upon the pre-set target values.

A hydraulic pump 22 is coupled directly by gears to the output of the engine 10 and supplies the vehicle components and the attached implements as well as an implement power take-off shaft 24. Therefore these rotate in proportion to the engine rotational speed.

In contrast to conventional drive concepts, the operator of the vehicle described here with infinitely variable transmission only has the possibility of providing the input for the target values for the velocity and engine rotational speed etc. through an electronic control unit (drive management). A direct influence on the engine operating point or the transmission drive ratio is no longer possible.

The operator provides the input of the target value and the electronic control determines the manner in which these targets are to be reached. The input of the target value for the vehicle speed can be made through a velocity selector lever, a gas pedal or a retarder circuit integrated into the brake pedal, which are not shown here but have been described, for example, in WO-94/06651. The vehicle speed input is provided with the selector lever. The use of the retarder or the gas pedal permits a modulation of the target velocity, where the foot-operated gas pedal permits an increase in the velocity or maintains that velocity despite an increase in the load, while the retarder decelerates the vehicle without friction devices. An additional hand-operated throttle lever establishes a particular engine rotational speed that either must be maintained as constant (power take-off shaft operation) or that may not be underrun.

Figure 2:
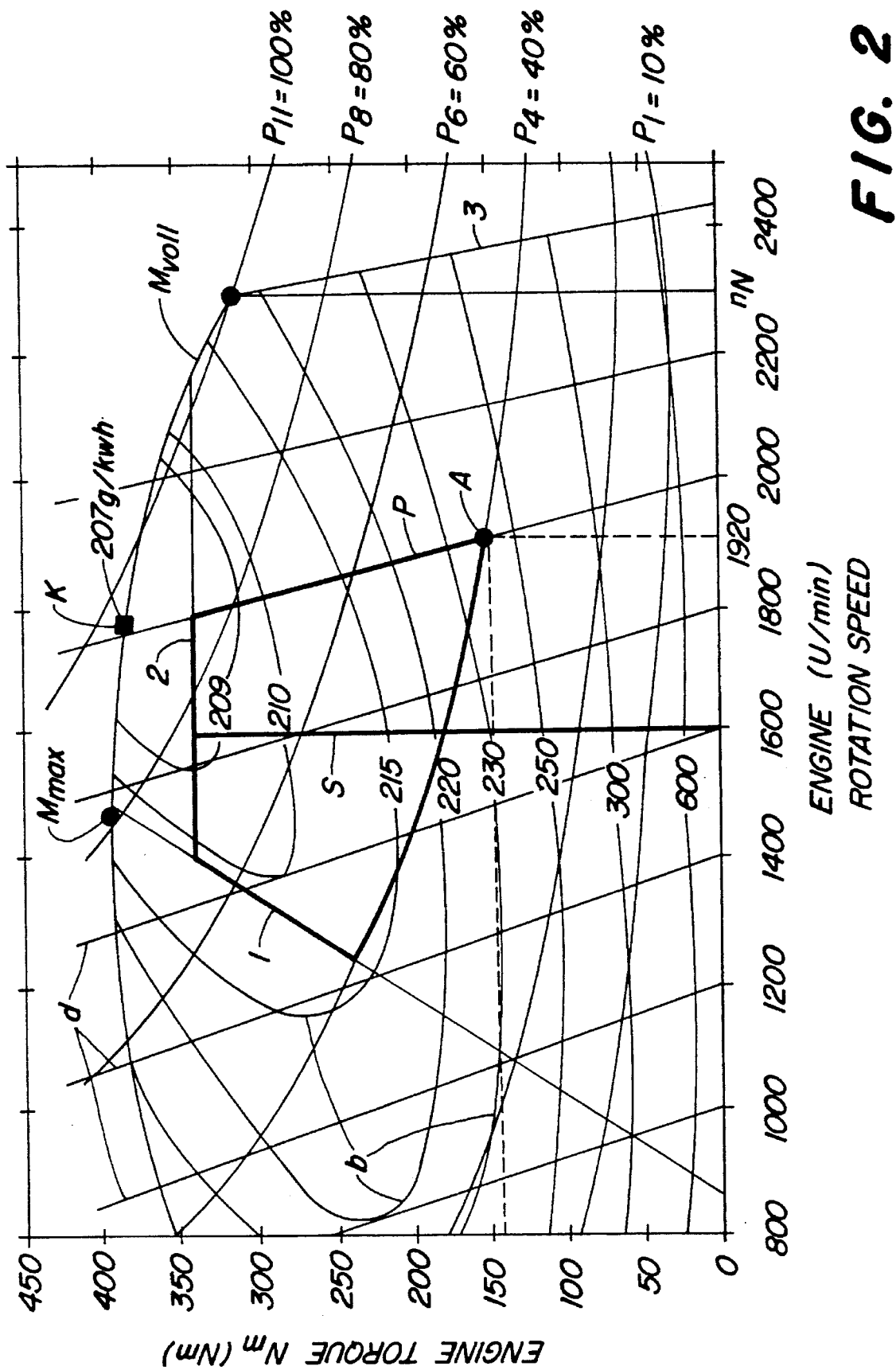
FIG. 2 shows an example of the characteristic of an engine with a definition of the curves of the control of the driveline.

The performance map of an engine shown in FIG. 2 characterizes an engine that is not yet optimized for an application with an infinitely variable transmission. This can be seen in the fact that the point K of the optimal specific fuel consumption is to the right of the point M(max) of the maximum engine torque.

The engine torque M(m) was plotted against the engine output rotational speed N(m) and the full-load torque curve M(voll) was entered. Furthermore the torque hyperbolas of constant power output P(i) including the rated power output PN are entered at the associated rated rotational speed N(N) as well as the lines of specific fuel consumption b and lines d of constant fuel injection pump position.

The lines d result from measurement points of the actual engine at different constant fuel injection pump positions. The actual d lines may be curved, but they are linearized and are stored in the memory of the controller as the straight lines d.

According to FIG. 2 the operating area of the engine is defined by the following lines or curves:

- the torque hyperbola of constant power output (P4=40%) of the special application case, which can be determined from full load rotational speed and actual rotational speed of the engine by means of the stored lines d of constant fuel injection pump position (proportional torque),
- the increasing speed control line 1, which has been established to define the smoke limit in the engine performance map is preferably a straight-line torque curve between the points of the lower idle rotational speed and the maximum torque M(max) of the full-load curve M(voll),
- the full-load control line 2, which is also preferably established as a straight line and defines the variation of the torque curve in the region of the most favorable fuel consumption, and
- a momentary performance map, according to which the engine, at a given quantity of fuel injected, reacts to a change in load.

Infinitely variable transmissions without a main clutch have the possible disadvantage that they cannot extract any additional energy from the flywheel during the start-up process and are therefore considered poor to react without special precautions. In order to counteract this behavior, the IVT does not operate the engine along the increasing speed control line 1 to control its acceleration or even to the left of this curve in the smoke region, but operates intermediate engine speeds, if necessary by means of the hand-operated throttle lever, in order to be prepared for unknown load demands.

Corresponding, for example, to a the very heavy line P in FIG. 2, the idle rotational speed was set at 2000 r.p.m. Here the mechanical fuel injection pump is able, through its internal characteristics, to automatically meet the demands of a load increase, whereby the rotational speed of the engine was reduced from 2000 r.p.m. to a value of 1920 r.p.m. Since the lines d of constant fuel injection pump position are stored in the memory of the IVT controller, it is possible to determine in this way the proportion of the load as x=40% of the rated torque.

The 40%-torque hyperbola is thereby defined and has a definite intersection with the increased speed control line 1, so that the engine rotational speed can be adjusted incrementally in the direction towards this point. For this purpose several calculation cycles may be required, where simultaneously the general level of the load may also change from cycle to cycle. The mechanical fuel injection pump can follow these demands without any problem, so that starting from the instantaneous lines d of constant fuel injection pump position, a known value for the target rotational speed and the measured value for the actual rotational speed, the input parameters for the next calculation cycle are available, as was explained in the preceding section.

If in the meantime, a minimum speed for the engine was given as input by the manually-operated throttle lever, then the intersection of the hyperbola is not calculated with the increasing speed control line 1, but with the vertical S to the rotational speed, which was provided as input by the manually-operated throttle lever. Here too, the process proceeds incrementally. From the polygon enclosed by the speed increasing control line 1, the full-load straight line 2; the lines d of constant fuel injection pump position and the load hyperbola, the area of the possible improvement in efficiency can be estimated (efficiency polygon). It can be seen clearly that the manually-operated throttle lever adjustment has almost halved the area of the efficiency polygon.

With power take-off shaft operation the same procedure is used with the difference that the manually-operated throttle lever adjustment is shifted further to the right into the vicinity of the line P or the design rotational speed of the power take-off shaft, in order to provide an input of a constant power take-off shaft rotational speed. Thereby the efficiency polygon has been reduced almost to a point.

The efficiency polygon and the rectangle starting at point A under the torque hyperbola thereby provide a good overview over the status of the driveline with respect to power output and efficiency.

In an engine preferred for application with IVT the point for the most favorable fuel consumption is at the extreme left and upward in the engine performance map (that is, at low engine rotational speed), in order to attain a great reduction in engine rotational speed and thereby gain a large improvement in mechanical efficiency of engine and transmission and to further improve efficiencies at optimum thermal loading of the engine.

At constant torque the full load straight line 2 lies preferably above the point of the rated load PN and begins at rotational speeds less than N(N), in order to make possible a closer accommodation of the performance map of the engine with that of the transmission. The accommodation in the region of the most favorable fuel consumption does not appear critical as long as the shell-shaped curves represent ellipses lying flat. Most appropriately, the full-load straight line lies 10% to 15% below the full load curve M(Voll), in order to retain a torque reserve for peak loads during heavy traction operations and, on the other hand, in order to avoid overloading the transmission over a longer period of time.

For relatively small loads the full-load operating point of the engine is located along the increased speed control line 1. With a further increase in the torque the engine behaves as already described. With a constant fuel injection quantity the engine increases its torque along the line P and the operating point moves to the left beyond the increasing speed control line 1.

Since the logic for the determination of the engine target and actual values has not changed, the associated hyperbola for constant power can be determined as described. When looking at the intersection of the hyperbola with the increasing speed control line 1 it is evident, however, that the hyperbola lies above the original hyperbola and can be brought to an intersection with the increased speed control line 1 only by increasing the rotational speed. The result is an intersection of the new hyperbola with the increased speed control line 1 at a higher level. In order to maintain the desired vehicle velocity an adjustment of the transmission drive ratio is necessary.

According to FIG. 2 the process described meets the load demands up to approximately 63% of the rated output. The hyperbolas greater than 63% no longer intersect with the increased speed control line 1. Instead they intersect with the full-load straight line 2, so that these intersections must be distinguished from each other.

For power output values greater than 63%, the engine operating point lies along the full-load straight line 2. An increase (decrease) in the load or the speed therefore requires an increase (decrease) in the power output of the engine, that is, the engine operating point is shifted along the full-load straight line 2 further to the right (left). This, again, occurs in incremental steps by an increase (decrease) in the engine rotational speed. Below the full-load straight line 2, however, all possibilities for improvement in efficiency are available by a change in the transmission drive ratio and a reduction in speed with a simultaneous increase in the torque in the direction toward the full-load straight line. The reduction (increase) in resistance connected with the reduction in speed may eventually require a further adjustment in the transmission drive ratio.

The speed reducing control line 3 for the rotational speed limitation of the Diesel engine protects the engine against excessive rotational speed, defects in the electronic control or against improper operation by the operator (for example, wide-open throttle setting at idle speed). This is attained by mechanical means in the mechanical fuel injection pump, but is being increasingly attained electronically in future fuel injection pumps.

While an increase (decrease) in vehicle power starting from a low power level (increased speed control line 1) requires a decrease (increase) of the transmission drive ratio with simultaneous increase (decrease) in the engine rotational speed, an increase in vehicle power starting from a high power level (full-load line 2) signifies an increase (decrease) in the transmission drive ratio with a simultaneous increase (decrease) in the engine rotational speed.

By infinitely variable changes in the transmission drive ratio the IVT permits operation over the entire speed range with constant engine output. As revealed by FIG. 3, the engine operating point X can be varied by adjusting different transmission drive ratios i in a region Y marked by arrows of the traction force hyperbola which lies between a minimum wheel rotational speed nrmin and a maximum wheel rotational speed nrmax. For this reason a vehicle with IVT could do without a constant power characteristic of the engine. Arguments for the retention of the constant power characteristic include: Greater penetration force for heavy power take-off shaft implements and a possible consolidation of the performance maps of the engine and the transmission.

Figure 3:
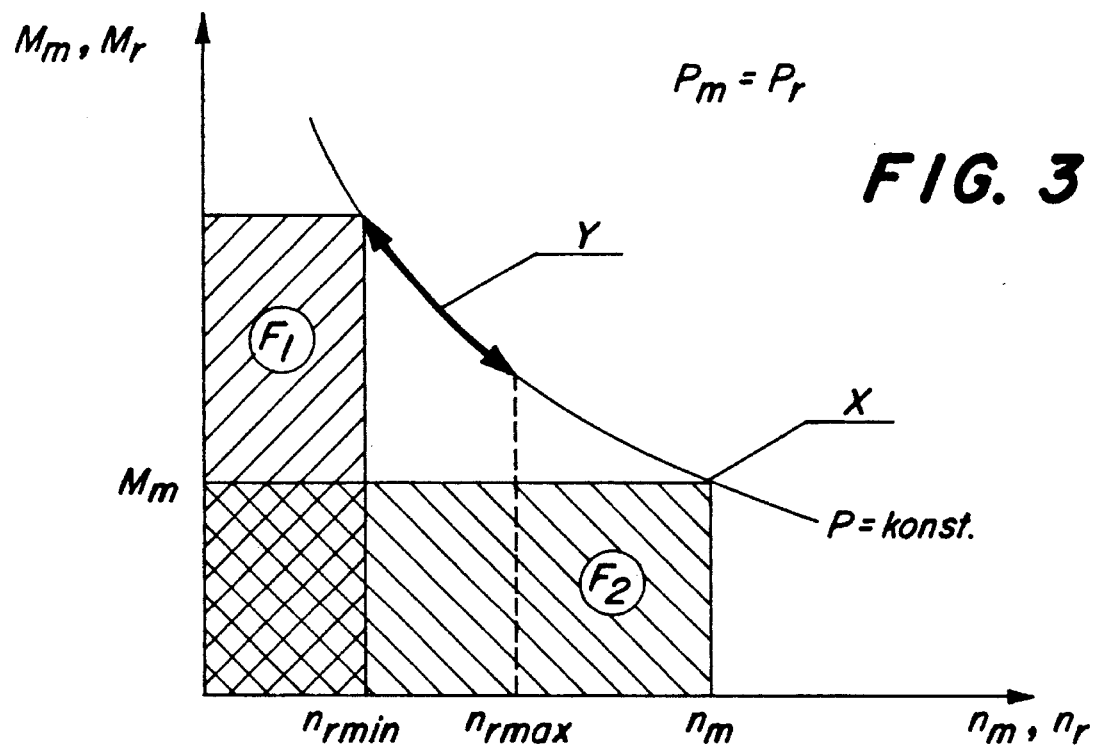
FIGS. 3, 4 and 5 show further engine characteristics relating to the invention.
Figure 4:
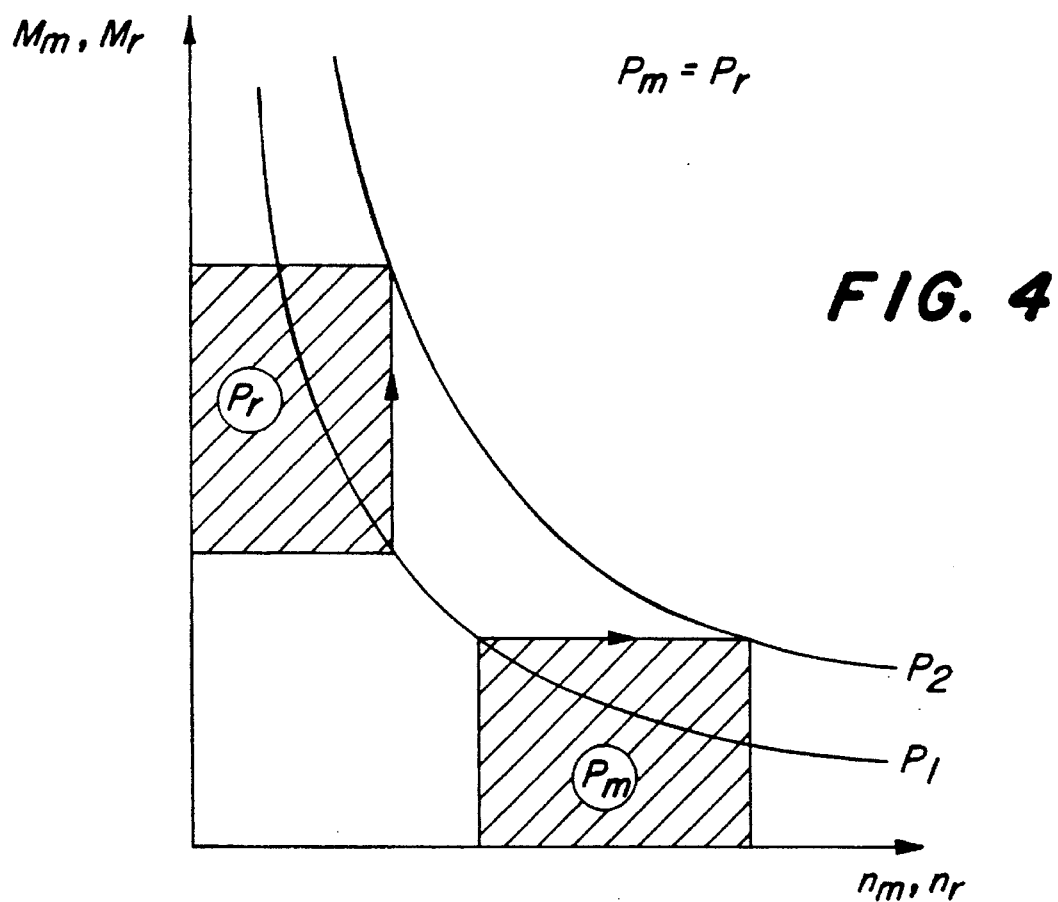

The power output may be represented as an area in the torque/r.p.m. diagram. Due to the relationship "P=M×n" all areas F1, F2 are located below a power hyperbola, are equal in area and represent a measure of the power output (FIG. 3). This also applies to the areas of the differential power output which, for example, must be made available by the engine for an increase in the load (FIG. 4).

For the sake of simplicity the efficiency η was initially disregarded or set equal to 1. Limitations of this type, however, do not exist, since the efficiency cancels out in the following equations.

Depending upon the magnitude of the disturbance and the control input, the necessary adjustments for a new operating point (IVT drive ratio, engine r.p.m.) are determined by appropriate control strategies. For this purpose the engine rotational speed nm and the output rotational speed nr are continuously measured and stored in memory. In order to recognize a change in the load, it is necessary to permit a decrease (increase) in the wheel speed or the engine speed, and to register it, before the control process can be brought into action.

On the basis of FIG. 5 the control strategy during load increase (engine depression) is explained as follows. The engine is operated along the full-load line, that is, at M(mo)= constant. In its final effect the desired vehicle velocity and therefore also the wheel rotational speed nro is to be held constant. The temporary reduction in wheel rotational speed due to engine depression is seen as negligible and is corrected in the course of the control process.

The following abbreviations are used:

| | |
|---|---|
| N(mo) | engine output rotational speed (measured) |
| N(mn) | new engine rotational speed (measured) |
| N(ms) | engine target rotational speed (calculated) |
| N(ro) | wheel output rotational speed (measured) |
| N(rn) | new wheel rotational speed (measured) |
| N(rs) | wheel target rotational speed (pre-set) |
| M(mo) | constant engine output torque |
| M(ro) | wheel output torque |
| M(rn) | new wheel torque |
| I(o) | IVT drive ratio at initial point (calculated) |
| I(n) | new IVT drive ratio (calculated) |

According to original assumption, the input and output power of the transmission are connected to each other as follows:

$$\eta \times 2\pi \times M(mo) \times N(mo) = 2\pi \times M(ro) \times N(ro) \quad (1).$$

Figure 5:
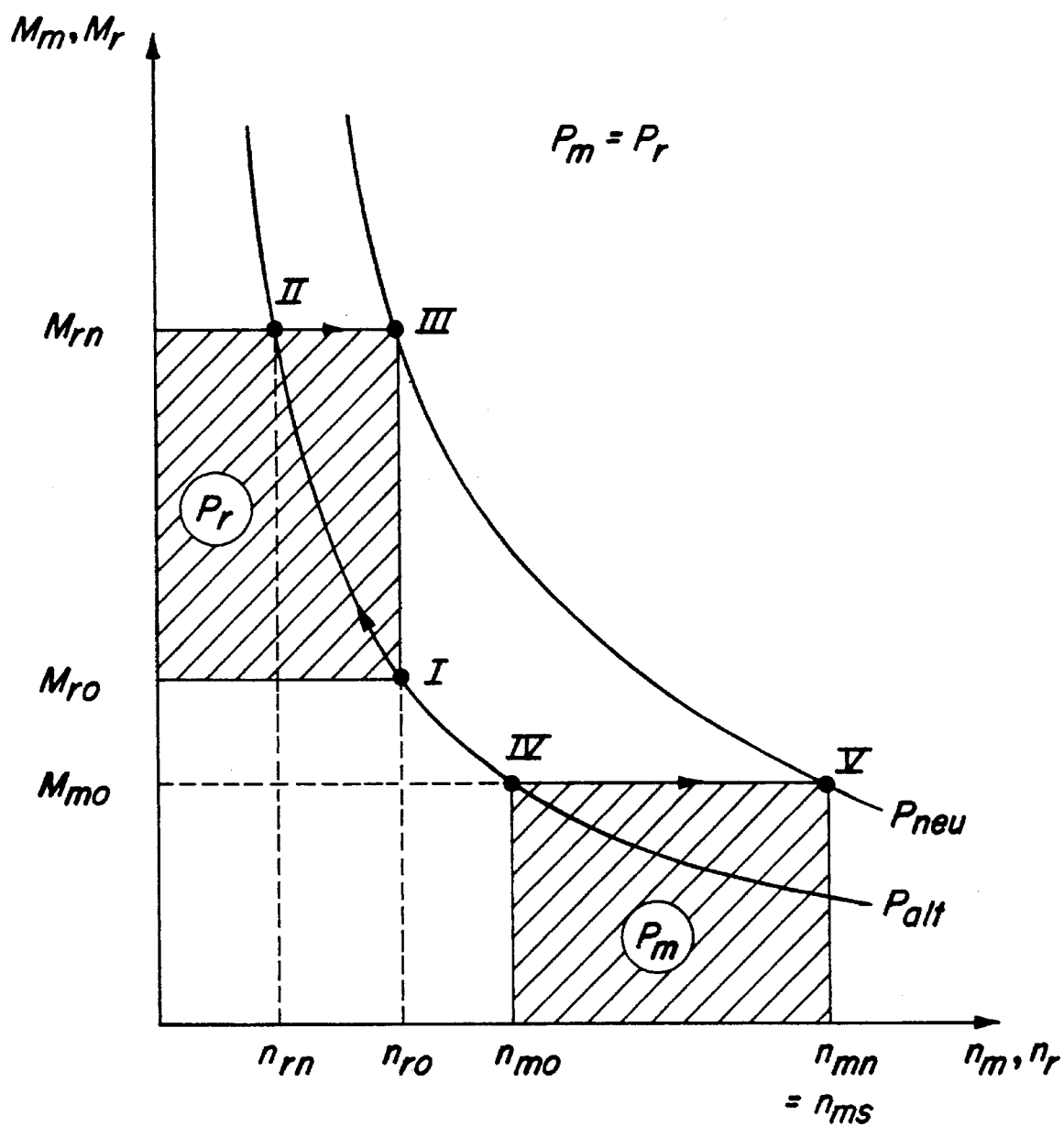

Due to the equal areas of the rectangles of FIG. 5 the above relationship also holds for the differential power output:

$$\eta \times 2\pi \times (N(mn)-N(mo)) \times M(mo) = 2\pi \times N(ro) \times (M(rn)-M(ro)) \quad (2).$$

It follows therefrom for a shift from (I) to (III) for the transmission or from (IV) to (V) for the engine:

$$N(mn)=N(mo) \times M(ro)/M(rn) \quad (3)$$

and $$I(n)=N(mn)/N(rn)=N(mo)/N(ro) \times M(ro)/M(rn) \quad (4).$$

Since these equations still contain a torque relationship, but for technical reasons only rotational speeds are being measured, it is necessary to divide the process into two phases.

In the first phase reaction is made to the engine depression observed (N(mn)<N(mo)), in that the transmission drive ratio (I=N(m)/N(r)) of the IVT is increased and thereby the wheel rotational speed N(r) is reduced, until the initial engine depression is compensated for and the engine output rotational speed N(mo) is again reached. Due to the increase in the transmission drive ratio the operating point of the wheel torque is shifted along the torque hyperbola shown in FIG. 5 from (I) to (II) and thereby from M(ro) to M(rn). This compensation insures that the engine operating point (IV) remains unchanged.

In the second phase the engine rotational speed (by increasing the fuel injection quantity) and the wheel rotational speed are raised, with constant engine and vehicle torques, until the original vehicle velocity is again reached, it had been lowered by the transmission drive ratio adjustment of the first phase. Thereby the engine power output as well as the wheel power output are increased and the operating points in FIG. 5 move from (IV) to (V) for the engine or from (II) to (III) for the transmission.

The goal is to attain the least possible deviation from the target rotational speed of the wheels (here: N(r)s=N(ro)). Therefore a process control is performed after phase one and two in brief time intervals and/or when the engine rotational speed is underrun or exceeded by a pre-set amount as a result of a change in the vehicle load.

In the first phase, in particular, the procedure is as follows:

With a load increase (see the example illustrated in FIG. 5) N(mo)/N(mn)>1. As long as N(mn)<N(mo) the IVT drive ratio is increased, whereby the wheel rotational speed is decreased. The following relationship can be derived for the new transmission drive ratio from the above equations:

$$I(n)=I(o) \times N(mo)/N(mn) \quad (5).$$

If the load is unchanged, then N(mo)/N(mn)=1. Therefore it follows that I(n)=I(o) and no change is performed on the drive ratio of the IVT.

When the load is reduced, then N(mo)/N(mn)<1. As long as N(mn)>N(mo) the IVT drive ratio is reduced whereby the wheel rotational speed is increased. The new drive ratio is here also calculated from the equation (5).

In the second phase, in particular, the procedure is as follows:

If the desired speed or load are increased (N(rs)/N(ro)>1) by means of the adjustment of the IVT in the first phase, then the wheel rotational speed N(rn) must change to comply. This is performed by an adjustment in the engine rotational speed at constant I(n) (as long as the speed decreasing control line 3 had not been reached). The change in the engine rotational speed is performed according to the following relation which can be derived from the above equations:

$$N(ms)=I(n) \times N(ro) \times N(rs)/N(ro) \quad (6).$$

If the speed and load remain unchanged, then N(rs)=N(ro) and thereby N(ms)=N(mo), and there is no change in the engine rotational speed.

When the load is reduced N(rs)/N(ro) will be less than 1. The engine rotational speed is reduced according to the relation (6) as long as the increased speed control line 1 on the left side had not previously been reached.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A driveline control system for a utility vehicle having an engine (10) with fuel injection control system, a manually-operated throttle lever, and an infinitely variable transmission (16), the driveline control system having means for determining and storing in memory an initial engine output rotational speed (N(mo)), an initial wheel rotational speed (N(ro)), an actual engine rotational speed (N(mn)) and an actual wheel rotational speed (N(m)), the driveline control system performing a method comprising the following steps:

increasing the transmission ratio of the infinitely variable transmission if the actual engine speed N(mn) is less than the initial engine speed N(mo);

decreasing the transmission ratio of the infinitely variable transmission if the actual engine speed N(mn) is greater than the initial engine speed N(mo); and while the transmission ratio remains constant, adjusting the engine speed until the actual wheel rotational speed N(m) is the same as the initial wheel rotational speed N(ro).

2. The method of claim 1, wherein:

the steps are repeated at regular time intervals.

3. The method of claim 1, wherein:

the initial wheel rotational speed (N(ro)) is replaced by a target wheel rotational speed value (N(rs)) which can be pre-set by an operator.

4. The method of claim 1, wherein:

in response to a change in engine rotational speed which results from a change to a new load, and by means of a stored engine characteristic in the form of lines d of constant fuel injection pump position, the control system determines a new load hyperbola of constant load corresponding to the new load and determines an intersection of the new load hyperbola with a pre-set increased speed control line or a pre-set full-load control line; and the control system adjusts the drive ratio of the transmission and adjusts the engine rotational speed in order to operate at favorable operating points of the engine performance map with respect to fuel consumption and emissions.

5. The method of claim 4, wherein:

the favorable operating points lie on an increased speed control line that can be pre-set or on a full-load control line that can be pre-set.

6. The method of claim 1, further comprising:

pre-setting and maintaining a desired engine rotational speed when the engine is powering an auxiliary devices.

7. The method of claim 1, characterized by:

in response to adjustment of the throttle lever, reducing an adjustment range of an automatic efficiency improvement so that defined engine rotational speeds are modified to accomodate an auxiliary drive unit driven by the engine.

8. The method of claim 1, wherein:

an auxiliary device is driven by the engine; and adjusting the transmission drive ratio in response to a changing load on the engine resulting from the auxiliary device to maintain a constant engine rotational speed while modifying the wheel rotational speed.

9. The method of claim 1, wherein:

a) the transmission drive ratio is raised or lowered according to the relation $I(n)=I(o)\times N(mo)/N(mn)$, wherein $I(o)$ is the original drive ratio and $I(n)$ is a new transmission drive ratio; and b) the engine rotational speed is adjusted according to the equation $N(ms)=I(n)\times N(ro)\times N(rs)/N(ro)$, wherein which $N(rs)$ is taken as $N(ro)$ the initial wheel rotational speed and $N(ms)$ is a new target rotational speed of the engine.

* * * * *